United States Patent [19]
Kotzin et al.

[11] Patent Number: 5,953,659
[45] Date of Patent: Sep. 14, 1999

[54] METHOD AND APPARATUS FOR PRODUCING DELAY OF A CARRIER SIGNAL FOR IMPLEMENTING SPATIAL DIVERSITY IN A COMMUNICATIONS SYSTEM

[75] Inventors: Michael D. Kotzin; Dennis R. Schaeffer, both of Buffalo Grove, Ill.

[73] Assignee: Motorola, Inc., Schaumburg, Ill.

[21] Appl. No.: 08/851,194

[22] Filed: May 5, 1997

[51] Int. Cl.⁶ .................................................... H04Q 7/20
[52] U.S. Cl. ........................................ 455/422; 455/277.1
[58] Field of Search ................................ 455/422, 277.1, 455/506, 80

[56] References Cited

U.S. PATENT DOCUMENTS

| | | | |
|---|---|---|---|
| 4,361,905 | 11/1982 | Etherington et al. | 455/277.1 |
| 4,710,944 | 12/1987 | Nossen | 455/506 |
| 5,180,998 | 1/1993 | Willems | 333/164 |
| 5,280,472 | 1/1994 | Gilhousen et al. | |
| 5,437,055 | 7/1995 | Wheatley, III. | |

Primary Examiner—William G. Trost
Assistant Examiner—Myron K. Wyche
Attorney, Agent, or Firm—Sayed Hossain Beladi

[57] ABSTRACT

A method and apparatus for implementing spatial diversity utilizing coaxial interconnections between a plurality of receivers, transmitters and radiating elements in a communication system is disclosed. The long coaxial line used for feeding associated receive antennas is used for creating delay of a signal for implementing downlink diversity. Similarly, the long coaxial lines used for feeding associated transmit antennas are used for creating delay of a signal for implementing uplink diversity. The method and apparatus, in particular, further includes utilization of at least one of the radiating elements for receiving a signal and transmitting a delayed version of a signal to be transmitted.

11 Claims, 5 Drawing Sheets

5,953,659

METHOD AND APPARATUS FOR PRODUCING DELAY OF A CARRIER SIGNAL FOR IMPLEMENTING SPATIAL DIVERSITY IN A COMMUNICATIONS SYSTEM

FIELD OF THE INVENTION

The present invention relates to communication systems, and more particularly, to implementing spatial diversity in such communication systems

BACKGROUND OF THE INVENTION

In a communication system, a signal is transmitted through an antenna assembly which is often remotely located in the fixed part of a communication system. A similar antenna assembly is utilized for receiving a signal in such communication system. FIG. 1 depicts such a communication system 100 implementing transmit and receive antenna assemblies. As shown in FIG. 1, a transmitter 101 generates a downlink signal which is amplified through a power amplifier 103. The amplified signal is passed to a remote antenna 105 through an antenna feed 104. The communication system 100 transmits the downlink signal from the antenna 105 to a user of the communication system 100. As also shown in FIG. 1, an uplink signal is received by an antenna 107 and is passed to a receiver 102 through an antenna feed 106. Generally, the antenna feeds 104 and 106 are long coaxial cables.

For downlink diversity, the communication system 100 transmits more than one portion of the downlink signal. The portions of the downlink signal are transmitted at certain time offsets. The actual amount of time offsets, commonly called delay, is selected for an optimum downlink diversity in a multipath environment. The amount of delay is for an amount such that a receiver which receives the downlink signals combines the transmitted signal and the delayed version to improve the reception gain. One example of such a receiver is a RAKE receiver in a Code Division Multiple Access (CDMA) system or an equalized receiver in a Time Division Multiple Access (TDMA) system.

The prior art process of generating a delayed version of a downlink signal transmitted for downlink diversity is complex and not cost effective. For example, in the prior art communication system 100, the transmitter 101 generates the downlink signal and its delayed version. Then, the delayed version is amplified through a power amplifier other than the amplifier 103, and transmitted through a remote antenna other than the antenna 105. Therefore, the prior art requires a plurality of transmitters, a corresponding plurality of power amplifiers and a corresponding plurality of transmitter antennas.

Further difficulty of the prior art for implementing downlink diversity is installing additional transmitters, power amplifiers and antennas in a pre-existing installed system. The communication system 100 very often does not have provision for such an expansion, because the high cost associated with providing the expansion capacity in the communication system 100. Moreover, the expansion capacity is typically not included in the communication system 100 because the need for downlink diversity is not foreseeable at the time of the initial installation.

For an uplink diversity, a receiver, like a RAKE receiver, receives a signal and portions of the signal that are not highly correlated, and combines these signals in the RAKE receiver to improve the receiver gain. A commonly used method in the prior art is that the communication system 100 has a plurality of receiving antennas, like the antenna 107, a plurality of corresponding receivers, like the receiver 102, and a plurality of corresponding antenna feeds for connecting the plurality of receivers to the corresponding antennas.

The receive antennas for uplink diversity should have sufficient spatial diversity in the form of decorrelation which is in the form of amplitude fading and delay spread. However, in certain situations, the delay spread of the signal can be very small and the position of the antennas themselves may not provide enough delay spread. A RAKE receiver has a property that it extracts signal portions that are sufficiently delayed in time, and combines the extracted portions for enhancing the receiver gain. If the delay spread of the signal is too small and the position of the antennas themselves do not provide enough delay spread, the RAKE receiver does not take full advantage of its diversity capability. In a CDMA communication system, a RAKE receiver needs at least a substantial fraction of one chip delay to take fill advantage of its diversity capability.

Therefore, there is a need for a method and apparatus to implement spatial diversity which overcomes the deficiencies of the prior art.

DETAILED DESCRIPTION OF A PREFERRED EMBODIMENT

Figure 1:
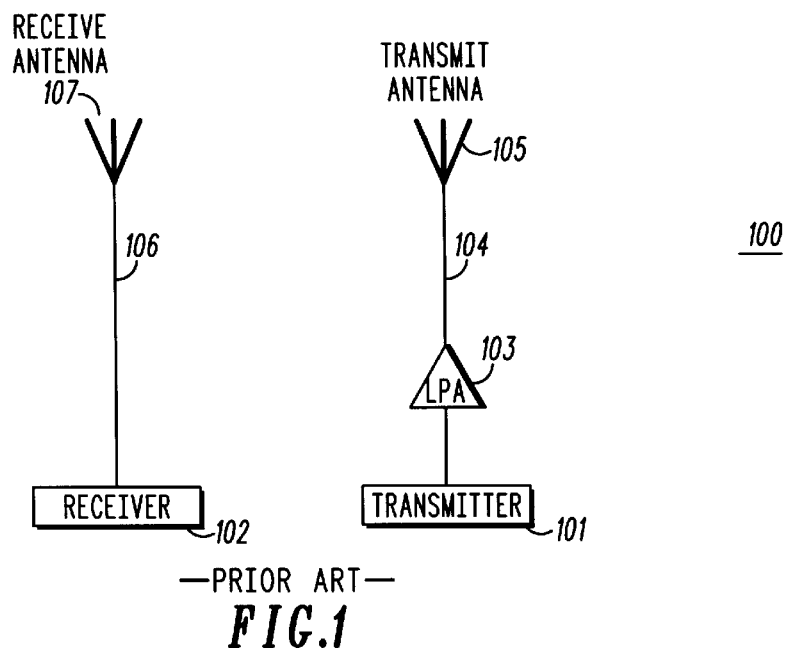
FIG. 1 depicts a prior art communication system.

Generally stated, a method and apparatus for implementing spatial diversity utilizing transmission interconnections between a plurality of receivers, transmitters and radiating elements in a communication system is disclosed. The long transmission line used for feeding associated receive antennas is used for creating delay of a signal for implementing downlink diversity. Similarly, the long coaxial lines used for feeding associated transmit antennas are used for creating delay of a signal for implementing uplink diversity. The method and apparatus, in particular, further includes utilization of at least one of the radiating elements for receiving a signal and transmitting a delayed version of a signal to be transmitted.

Stated more specifically, a method of creating delay comprises the steps of receiving a first signal at a first port and outputting a delayed version of the first signal from a second port. The first signal is then directed, from the first port to one end of a first transmission line, to travel down the transmission line where it is reflected, from the other end of the first transmission line, to create delay proportional to twice an electrical length of the first transmission line. The delayed version of the signal is then directed out of the second port. The method also includes the steps of receiving a second signal from the second port, directing the second signal from the second port to the one end of the first transmission line and receiving the second signal at the other end of the first transmission line. In the preferred embodiment, the first signal and the second signal frequencies are not the same frequency.

Also disclosed is a method of interconnecting a plurality of antennas to a cellular base station for implementing spatial diversity, comprising the steps of coupling a signal being transmitted, from a transmitter of the base station, to a first antenna from the plurality of antennas using a first coupling means, creating a delayed version of the signal being transmitted by utilizing a second coupling means and transmitting the delayed signal using a second antenna from the plurality of antennas. In this embodiment, the signal is coupled from the second antenna to a receiver of the base station using the second coupling means and the spatial diversity is for a downlink diversity.

An additional method of interconnecting a plurality of remote antennas to a cellular base station for implementing spatial diversity, comprises the steps of coupling a first signal from a first antenna from the plurality of remote antennas to a RAKE receiver of the base station using a first coupling means, creating a delayed version of a second signal being received by a second antenna from the plurality of antennas by utilizing a second coupling means and coupling the delayed version of the second received signal to the RAKE receiver using the second coupling means. In this method, the signal to be transmitted is coupled from the base station to the second antenna utilizing the second coupling means. In this method, the spatial diversity is for uplink diversity.

An additional apparatus for implementing downlink diversity in a communication system is also disclosed. The apparatus comprises a transmitting source for transmitting a first signal at a transmit frequency from a first antenna to a user, a splitter for producing a replica of the first signal at the transmit frequency, a receiver, at one end of a first coaxial line, for receiving a second signal at a receive frequency, the second signal received by a second antenna and means for directing the replica of the first signal at the transmit frequency to travel from the other end of the first coaxial line to the receiver such that the receiver reflects the replica of the first signal to produce a delayed replica of the first signal, the means for directing further directing the delayed replica of the first signal to the second antenna for transmission to the user. In this embodiment, the means for directing comprises a filter having an input for receiving the replica of the first signal and an output for outputting the same, wherein the output of the filter reflects signals at the receive frequency and a circulator having a first port connected to the output of the filter, a second port connected to the other end of the first coaxial line, and a third port connected to the second antenna.

Also disclosed is a method of producing delay of a signal to implement uplink or downlink spatial diversity in a communication system. The method includes the steps of producing a first and second signal via a signal source and time delaying the first signal using a coaxial conductor of a pre-existing antenna structure to produce a time delayed version of the first signal, the pre-existing antenna structure comprising a pre-existing transmit antenna structure for uplink spatial diversity and a pre-existing receive antenna structure for downlink spatial diversity. The time delayed version of the first signal and the second signal are then presented to a receiver to implement uplink or downlink spatial diversity. When downlink spatial diversity is implemented, the transmitter resides in a base-station of the communication system and the receiver resides in a mobile station. When uplink spatial diversity is implemented, the transmitter resides in a mobile station and the receiver resides in a base-station of the communication system.

Figure 2:
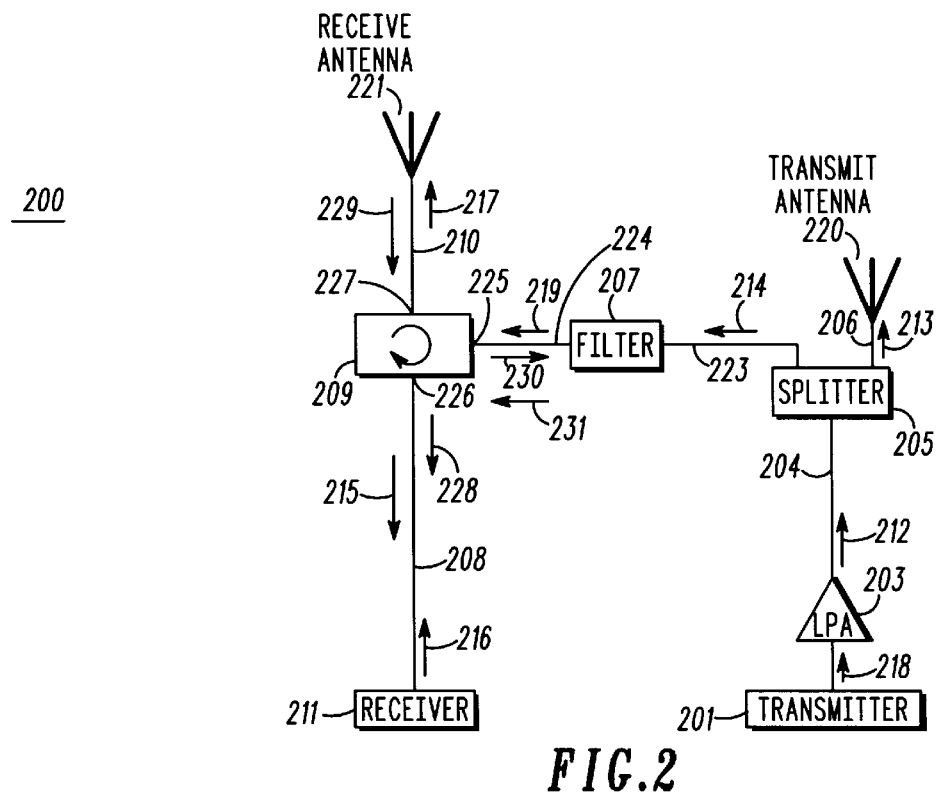
FIG. 2 depicts an embodiment of the present invention for a technique of implementing downlink diversity.

FIG. 2 generally depicts an embodiment of the present invention for a technique of implementing downlink diversity by creating delay in a portion of the signal and transmit the signal and its delayed version. The transmitter 201 produces a signal 218 which is amplified through a linear power amplifier 203 for producing an amplified signal 212. The output of the amplifier 203 is connected through a coaxial cable 204 to a splitter 205. The amplified signal 212 is split into two copies in the splitter 205. The portions of the signal 212 are signals 213 and 214, one of which is transmitted directly, and the other delayed before being transmitted. For example, the signal 213 is fed to an antenna 220 through a coaxial connector 206 where it is transmitted directly through the antenna 220.

To create delay in the signal 214 in accordance with the invention, the signal 214 is fed to a filter 207 through a coaxial connector 223. The filter 207 forwards the signal 214 to its output as a signal 219. The filter 207 forwards signals at the transmit frequencies and reflects signals at the receive frequencies. When receive and transmit frequencies are far apart, for example as much as 30–45 MHz which is typical for today's land and mobile communication system, such a filter implementation is easily accomplished as one skilled in the art will appreciate.

The signal 219 is fed through a coaxial connector 224 to a circulator 209 having three ports 225, 226, and 227. Port 225 receives the signal 219 through the coaxial connector 224. As is well known in the art, the circulator 209 directs a signal received at port 225 only to port 226, at port 226 only to port 227, and at port 227 only to port 225. Thus, the circulator 209 forwards the signal 219 received at port 225 only to port 226 as a signal 215.

Port 226 is connected to a coaxial cable 208 which is connected to a receiver 211. The receiver 211 reflects signals at the transmit frequencies, such as signal 215, and receives signals at the receive frequencies. The signal 215 travels down the coaxial cable 208, and is reflected back by the receiver 211 as a signal 216 which is received at the port 226 of the circulator 209. In the circulator 209, the signal 216 is directed to port 227 where it becomes signal 217. Port 227 is connected to a coaxial cable 210 which is connected to a receiver antenna 221. Consequently, the signal 217 is transmitted from the receive antenna 221. The signal 217 is the same signal as the signal 213 except it has been delayed for an amount of time corresponding to approximately twice the electrical length of the coaxial line 208. In addition, there are other elements in the signal path which create delay in the signal 217, such as the filter 207, circulator 209 and other coaxial connector and cables. As one skilled the art will appreciate, coaxial cable 208 is normally a long coaxial cable, however, the electrical length of the coaxial cables, and other delay elements, including inserting additional coaxial cable between the coaxial connectors, are selected to create a delay amount as required for the particular system implementation. Since the signal 217 is essentially a copy of the signal 213, spatial downlink diversity of signals 213 and 217 is implemented in accordance with the present invention.

Still referring to FIG. 2, the antenna 221 is also used for receiving a signal such as a signal 229. The signal 229 is at the receive frequency which is far from the transmit frequency band as much as 30–45 MHz. The signal 229 is received by the antenna 221, and, through the coaxial connector 210, is fed to port 227 of circulator 209. Circulator 209 directs signal 229 to port 225 as a signal 230. Circulator port 225 is connected to an output port of filter 207. As described above, filter 207 reflects signals at the receive frequencies, thus, the signal 230 is reflected as a signal 231 which is then received at circulator port 225 and directed to port 226 as a signal 228. Signal 228 is eventually received by the receiver 211.

Therefore, according to the present invention, the delayed signal 217 is transmitted by the receive antenna 221 for downlink diversity, and the signal 229 is received by the same receive antenna 221 and directed to receiver 211 as the signal 228.

Normally, coaxial cable 208, circulator 209, filter 207, other coaxial cables and connectors are low loss components. Typically, amplifiers or selective attenuators (not shown) are added in the signal paths to maintain required signals levels for optimum system operation. For example, the signal 228 needs amplification for proper reception by receiver 211, since signal 229 through its propagation through circulator 209 and reflection by filter 207, loses some of its signal strength. In another example, an attenuator is inserted between transmit antenna 220 and connector 206 to maintain the amplitude of signals 213 and 217.

Figure 3:
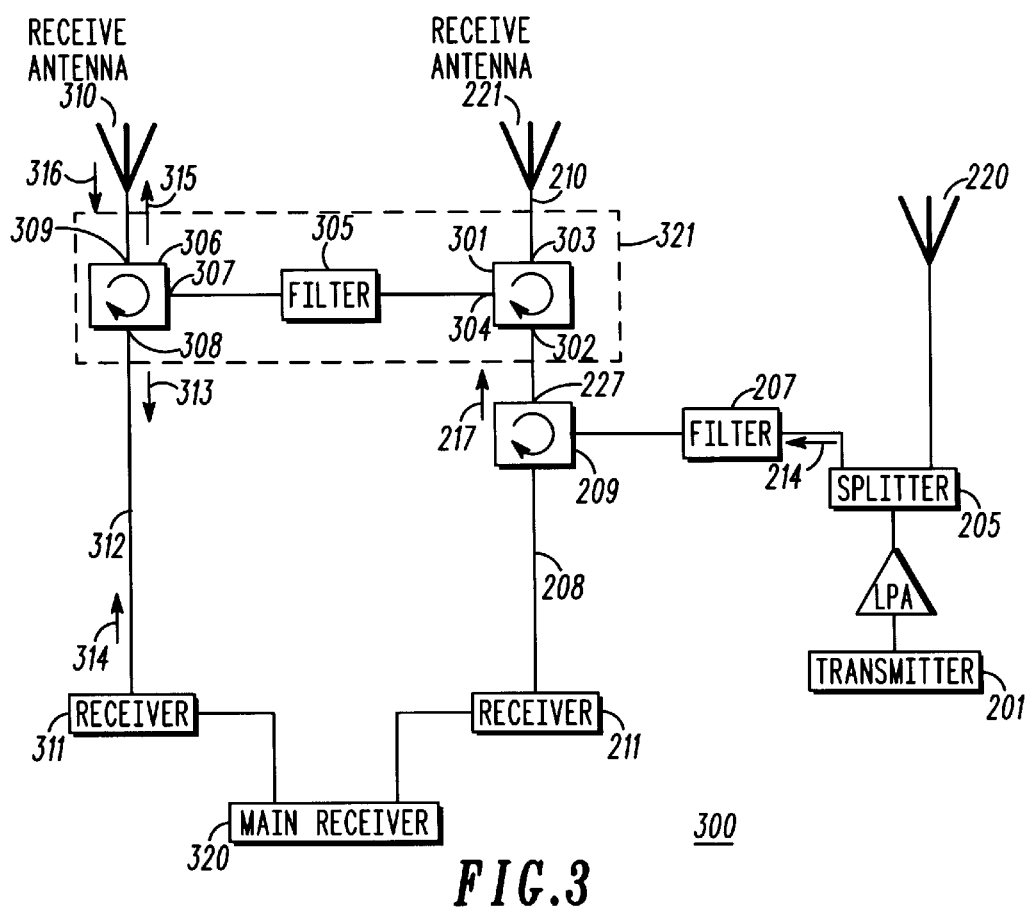
FIG. 3 depicts an embodiment of the present invention for a technique of implementing downlink diversity in a communication system that includes two receiver antennas.

FIG. 3 generally depicts the present invention of an antenna assembly as shown for a communication system 300 that includes two receiver antennas, 221 and 310 to implement spatial uplink diversity in accordance with the invention. The communication system 300 as shown in FIG. 3 and the communication system 200 as shown in FIG. 2 have common elements, which are shown with common numeral designations.

To take advantage of additional coaxial cable, like coaxial cable 312, a block 321 is added to the antenna assembly in addition to the elements which are shown and described in FIG. 2. Block 321 includes two circulators, 301 and 306, each having three ports, and a filter 305 having the reflecting and forwarding properties of the filter 207. A signal received at each port of circulators 301 and 306 is passed only to the nearest port in clockwise direction as shown in FIG. 3. Circulators 301 and 306 and filter 305 in the block 321 are connected in series as shown in the FIG. 3. The block 321 has two pairs of ports; ports 302 and 303 of circulator 301 and ports 308 and 309 of circulator 306.

With reference to FIG. 2 and FIG. 3, the connection at port 227 and coaxial connector 210 is broken to insert block 321. Port 302 is connected to port 227, and port 303 is connected to coaxial connector 210 as shown in FIG. 3. Further, port 309 is connected to antenna 310, and port 308 is connected to a coaxial line 312 that at its other end, is connected to receiver 311.

Signal 217 would not be transmitted from antenna 221 as shown in FIG. 3, unlike what was described for communication system 200 in the FIG. 2. Instead, signal 217 is passed to port 304 of circulator 301, then passes through filter 305 and is received by port 307 of circulator 306. Circulator 306 passes the signal received at port 307 to port 308 as a signal 313 for traveling down the coaxial line 312 which is connecting port 308 to receiver 311.

Receiver 311 reflects signal 313 because of the signal frequency not being a receive frequency. Signal 313 travels back on coaxial line 312 as a signal 314 to be received at port 308 of circulator 306. Circulator 306 passes signal 314 as a signal 315 to port 309 which is connected to antenna 310. Consequently, signal 315 is thus delayed and transmitted from receive antenna 310 to implement spatial transmit diversity in accordance with the invention.

In addition to transmitting signal 315 from antenna 310, antenna 310 also receives a signal 316 which is passed to port 309 of circulator 306. Similar to what was described for received signal 229 of the FIG. 2, signal 316 is directed to filter 305 at port 307, and is then reflected back to circulator 306 at the same port since filter 305 has a property of reflecting signals at frequencies other than the transmit frequencies. Circulator 306 directs the signal received at port 307 to port 308 where it then travels down coaxial cable 312 to be received by receiver 311. Therefore, in accordance with the present invention, signal 315 is further delayed and transmitted for spatial downlink diversity by antenna 310, and signal 316, received by the same antenna, is directed to be received by receiver 311.

There are only two receive antennas, 221 and 310, in this case, as shown in the FIG. 3. Multiple receive antennas in a communication system like the communication system 300 are implemented and used for the purpose of uplink diversity. Each of the antennas 310 and 221 receive one signal, and each antenna passes its received signal to a corresponding receiver. All of the received signals are combined in a main receiver 320 for the purpose of uplink diversity. Similar to what was describe for signal 229 in FIG. 2 and signal 316 in the FIG. 3, a signal received at antenna 221 is passed to receiver 211 as shown in the FIG. 3. Therefore, in accordance with the present invention, the antenna assembly as shown in the FIG. 3 receives two uplink diversity signals, each at the antennas 310 and 221 and transmits two signals from the antennas 220 and 310 for spatial downlink diversity.

Figure 4:
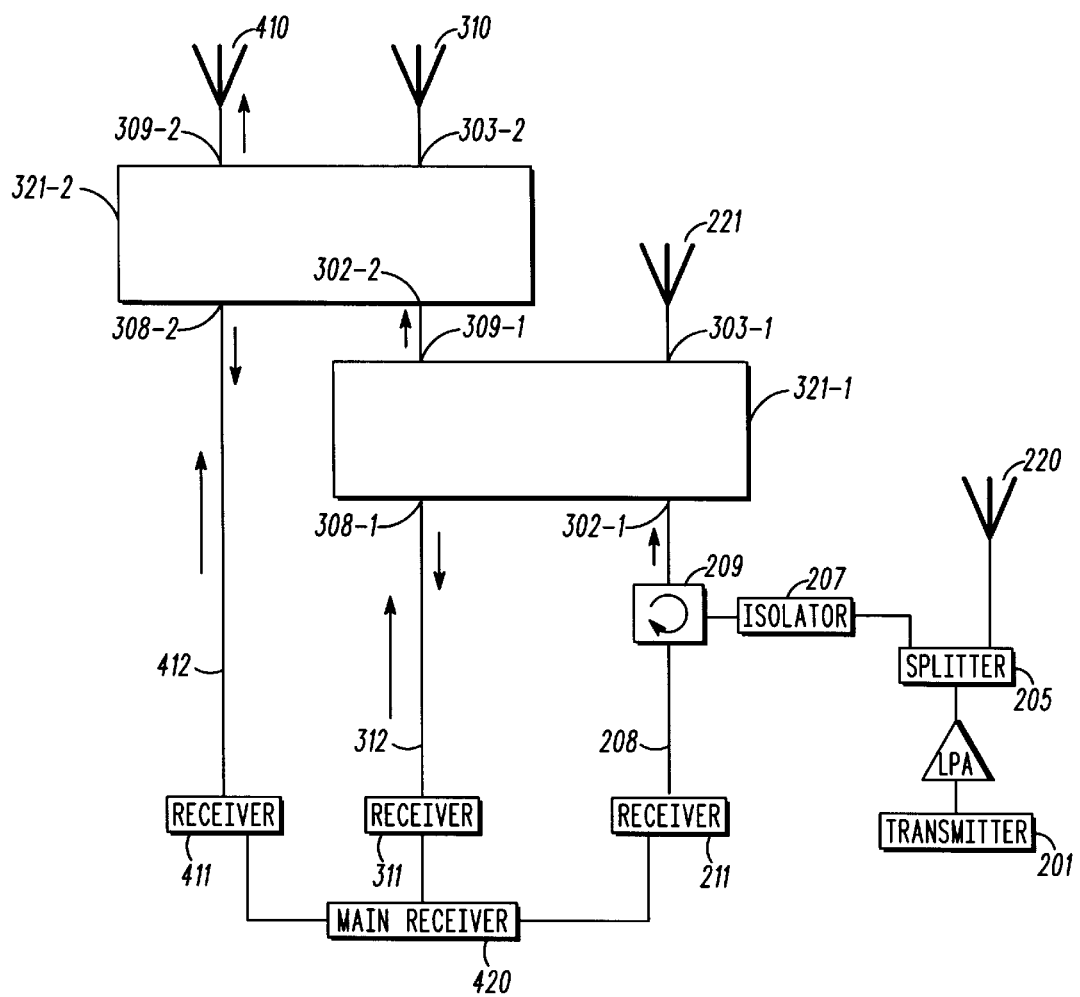
FIG. 4 depicts an embodiment of the present invention for a technique of implementing downlink diversity in a communication system that includes three receiver antennas.

FIG. 4 generally depicts a communication system 400 having three receive antennas, 221, 310 and 410, and corresponding receivers, 211, 311 and 411. For downlink diversity, the signal to be delayed is transmitted through antenna 410. The delayed signal for the downlink diversity is delayed for a longer time by utilizing a coaxial line 412. The longer delay time through the coaxial line 412 is accomplished by adding blocks 321-1 and 321-2 as shown in the FIG. 4. The blocks 321-1 and 321-2 are identical and are the same as block 321 as shown in the FIG. 3. In accordance with the present invention, the block 321-2 is added to take advantage of the coaxial line 412 for creating a longer delay in a signal to be transmitted for downlink diversity. The coaxial line 412 adds an additional amount of delay that is approximately equal to twice its electrical length.

Similar to what was describe for the signal 316 in the FIG. 3, and now with reference to the FIG. 4, for uplink diversity when combining three or fewer signals, a receive signal at antenna 410 is directed to receiver 411, a signal received at antenna 310 is directed to receiver 311, and a signal received at antenna 221 is directed to receiver 211. Therefore, in accordance with the present invention, a longer delay is created in a downlink diversity signal to be transmitted from the antenna 410, and three uplink diversity signals are received at the antennas 221, 310 and 410. Further in accordance with the present invention, if there are more than three pairs of uplink diversity receivers and antennas, blocks similar to block 321 can be added to create more delay in the downlink diversity signal by taking advantage of the additional coaxial lines, and receive respective uplink diversity signals at every uplink diversity receiver and antenna pairs.

Figure 5:
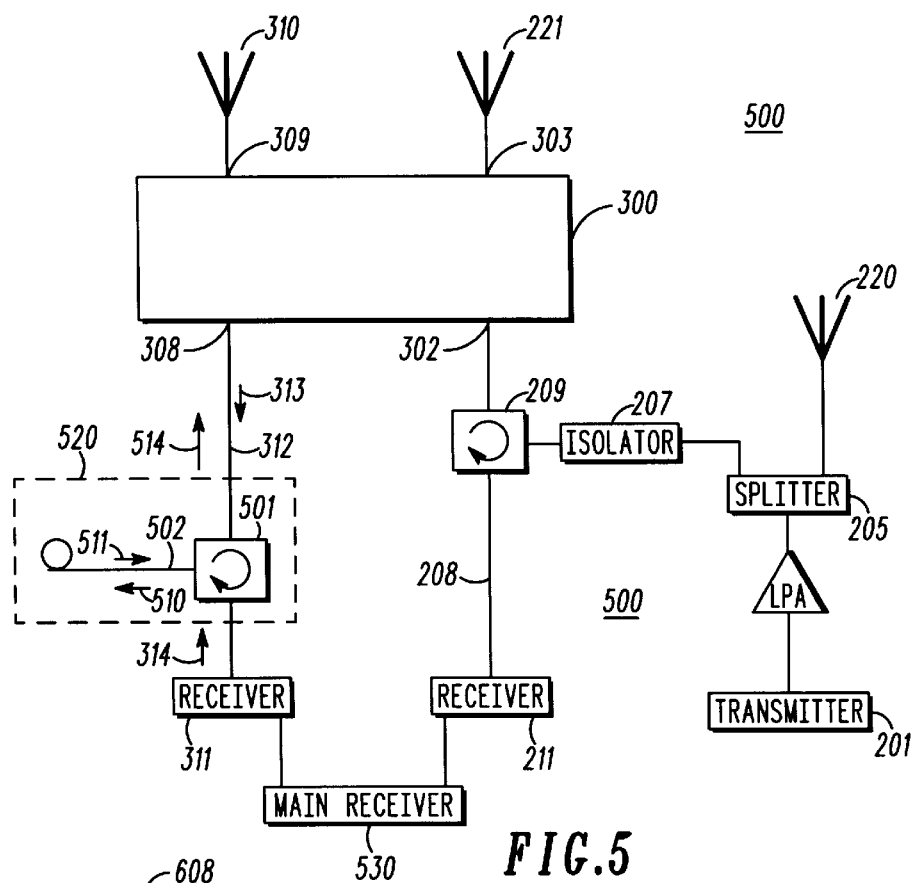
FIG. 5 depicts an embodiment of the present invention for a technique of implementing downlink diversity in a communication system that includes a delay extender.

In FIG. 5, the present invention is shown to include a delay extender 520 in the communication system 500. Delay extender 520 is inserted at the connection of receiver 311 to coaxial cable 312. As shown in FIG. 5, delay extender 520 includes a circulator 501 with clockwise signal directivity, and a coaxial cable with its center conductor shorted to its outer conductor.

As it was described before with reference to FIG. 3, signal 314 is reflected back from receiver 311. Signal 314, in FIG. 5, is directed by circulator 501 to travel along coaxial cable 502 as a signal 510. Since an end of coaxial cable 502 is shorted, signal 510 is reflected back as a signal 511. Circulator 501 directs signal 511 as a signal 514 on coaxial cable 312. The electrical length of coaxial cable 502 adds additional delay, approximately equal to twice its electrical length, to the delayed signal for the downlink diversity. Signal 514 is transmitted from receive antenna 310 as was described previously with reference to signal 314 of FIG. 3. Therefore, in accordance with the present invention, delay extender 520 is inserted to create more delay in the delayed signal. Other possible insertion points are between receiver 211 and coaxial cable 208, and receiver 411 and coaxial cable 412 of FIG. 4.

Figure 6:
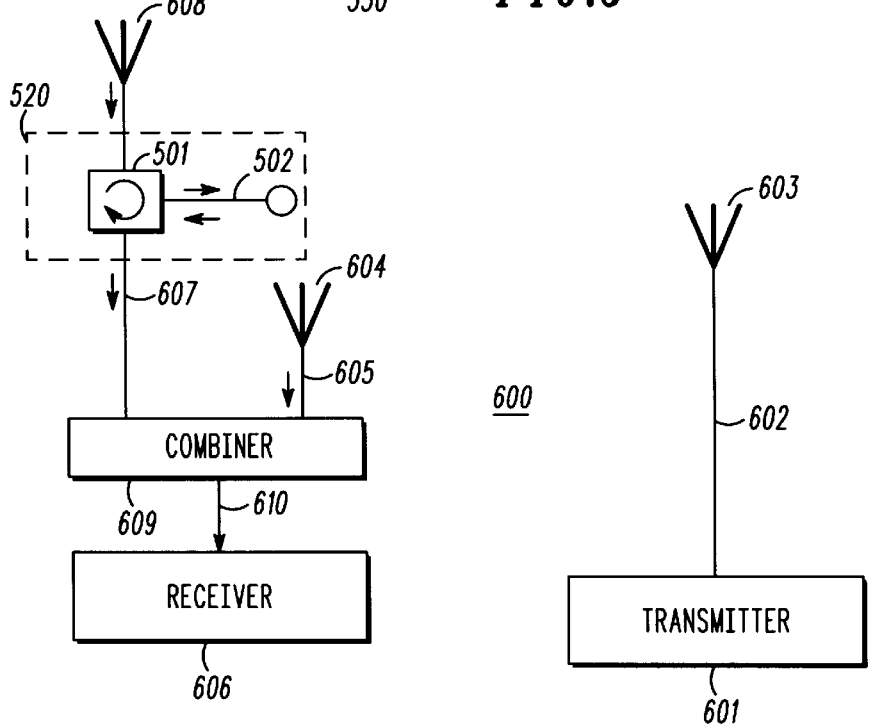
FIG. 6 depicts an embodiment of the present invention for a technique of implementing uplink diversity in a communication system.

FIG. 6 generally depicts an embodiment of the present invention for a technique of implementing uplink diversity in a communication system 600. Important to note is that uplink diversity is implemented as shown in FIG. 6 with only a single input into the receiver 606; prior art systems typically employ uplink diversity with receivers having two separate inputs, one for a first signal and the other for the delayed replica. As shown in FIG. 6, the communication system 600 is comprised of two antennas 608 and 604 which are each capable of receiving an uplink signal. The orientation of the antennas 608 and 604 can be such that the signal received by each antenna 608 and 604 are not delayed in time. In this scenario, to implement uplink diversity in accordance with the invention, a delay extender 520 is inserted in the signal path related to antenna 608.

Delay extender 520 accepts the signal received by antenna 608, and circulator 501 directs the signal to travel on coaxial cable 502. Coaxial cable 502 is shorted at one end, and as such, the signal is reflected back to again be accepted by circulator 501. Circulator 501 directs the reflected signal toward a combiner 609 which combines the delayed signal with the direct signal received by antenna 604. In this embodiment, the delayed signal is delayed by an amount of time approximately equal to twice the electrical length of the coaxial cable 502. The output of the combiner 609 thus includes the delayed signal (from antenna 608) and the direct signal (from antenna 604) on line 610. Since both the delayed signal and the direct signal are on the line 610 entering the receiver 606, the receiver is capable of implementing uplink diversity with a single input in accordance with the invention, even though the signal received by both antennas 608 and 604 were received at approximately the same time.

Figure 7:
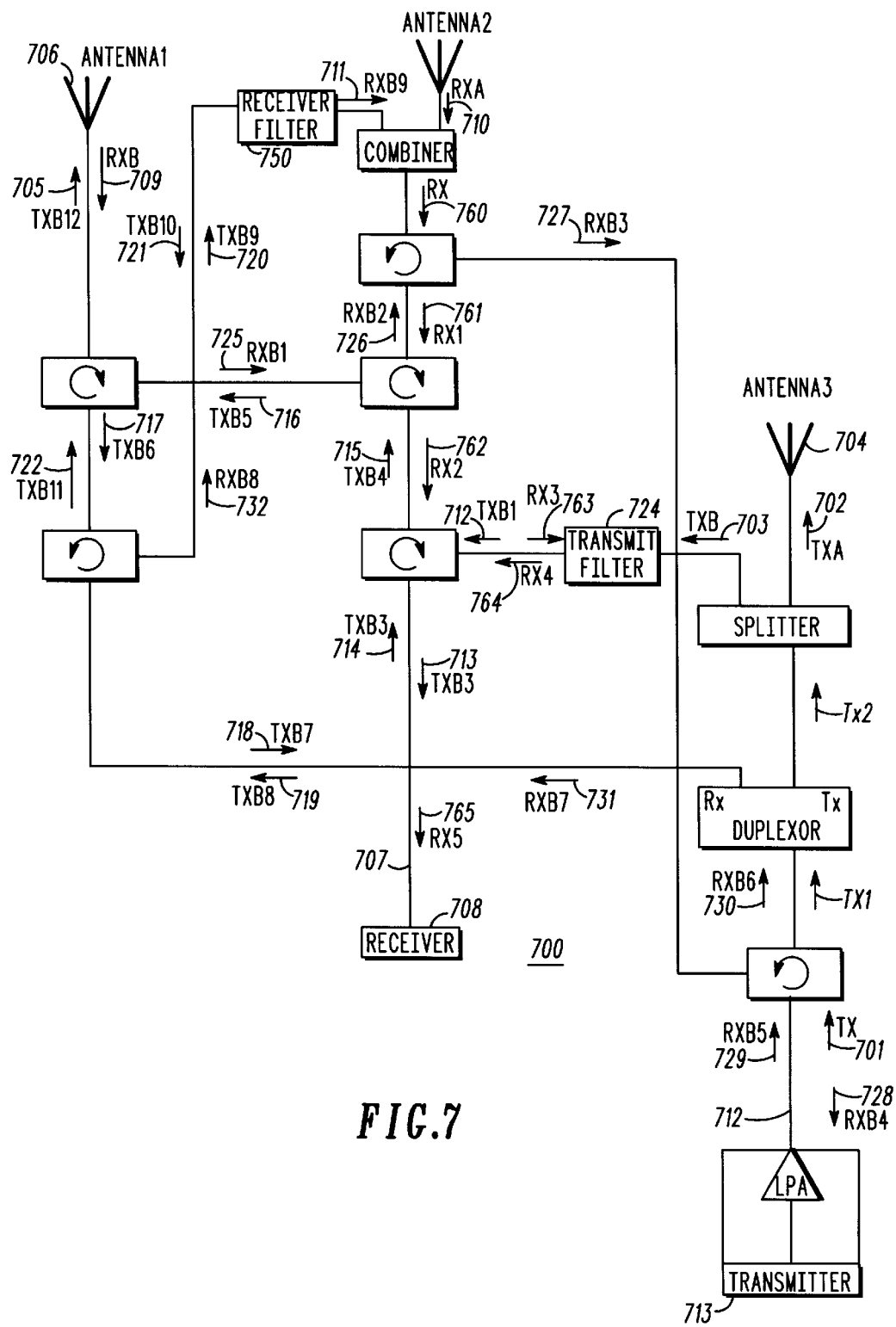
FIG. 7 depicts an embodiment of the present invention for combining downlink and uplink diversity.

FIG. 7 generally depicts an embodiment which includes implementation of simultaneous spatial downlink and uplink diversity in a communication system 700 in accordance with the invention. For downlink diversity, a signal 701 is generated (signal TX) and divided into signals 702 and 703 (signals TXA and TXB.) The signal 702 is transmitted through antenna 704. For implementing diversity, the signal 703 is delayed before being transmitted as a signal 705 (TXB 12) by an antenna 706. Referring to the flow of the signal 703, where the flow is shown by following consecutive numbers labeled after the label TXB, it is understood that the signal TXB 12 is delayed for at least twice the electrical length of a coaxial line 707. The coaxial line 707 is the antenna feed that connects the remote antennas to a receiver 708. For following signal 703 to signal 705, the signal 703 is a signal 712 shown after a transmit filter 724. Then, the signal 712 is directed to become a signal 713 which is reflected by receiver 708 as a signal 714. By consecutively following signals 715–722, signal 714 is finally directed as signal 722 which is then directed to be signal 705. The signal 705 is a delayed version of signal 703 which is transmitted by antennas 706 for downlink diversity.

The communication system 700 also implements uplink diversity by combining received signals, 710 and 711, labeled as RXA and RXB9 respectively. The signal 711 is a delayed version of a signal 709, labeled RXB, received by antenna 706. Referring to the flow of the signal 709, where the order of the signal flow is shown by consecutive numbers shown after the label RXB, it is understood that the signal 711 is delayed for at least twice the electrical length of a coaxial cable 712. The coaxial cable 712, is the coaxial line connecting essentially a transmitter 713 to the remote antennas.

The signal 709 is directed to be a signal 725. By consecutively following signals 725 through 732, signal 732 is delayed at least for twice the electrical length of coaxial cable 712. A receive filter 750 passes signals at receive frequency and reflects signal at transmit frequency. Therefore, the signal 732 is passed to be signal 711. The transmitter/LPA 713 reflects signals at receive frequency, thus, signal 728 is reflected as signal 729 which creates delay in the reflected signal for twice the electrical length of coaxial line 712.

The combination of signal 710 and 711 is shown as a signal 760 which is directed consecutively as signal 761 through 765. The signal 765 is received by receiver 708 which implements a RAKE receiver for extracting the time delayed and direct signals for enhancing receiver gain, thereby, implementing uplink diversity in accordance with the invention.

Therefore, the communication system 700 of the preferred embodiment is a method of implementing two branch downlink and two branch uplink diversity with three antennas structures. It is also understood that the delay extender 520, or multiple delay extenders 520, can be implemented in the communication system 700 to increase the amount of delay to implement uplink and downlink diversity as system requirements dictate. It is also understood that, while coaxial cables have been described herein as the primary elements utilized to induce delay, any other suitable element such as a waveguide, twin-lead, twisted pair, etc. could be implemented herein. As these other suitable elements operate at various frequency ranges, it should be apparent to one skilled in the art that the concepts disclosed herein in accordance with the invention are not limited by the frequency of operation.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of implementing spatial diversity in a communication system, comprising:

receiving at a first port a first signal originated from a transmitter in said communication system;

outputting a delayed version of said first signal from a second port coupled to a first antenna in said communication system;

directing, from said first port to a first end of a first transmission line, said first signal to travel down said transmission line;

reflecting, from a second end of said first transmission line coupled to a receiver in said communication system, said first signal to create delay, proportional to twice an electrical length of said first transmission line, in said first signal for producing said delayed version of said first signal;

directing said delayed version of said first signal to output from said second port;

transmitting said delayed version of said first signal and said first signal from said first antenna and a second antenna coupled to said transmitter, respectively, for implementing spatial downlink diversity.

2. The method as recited in claim 1, further comprising:

receiving a second signal from said second port, wherein said second signal originally received by said first antenna;

directing said second signal from said second port to be received by said receiver via said first transmission line.

3. The method as recited in claim 2, wherein said first signal and said second signal frequencies are different frequencies.

4. The method as recited in claim 1, wherein said delayed version of the first signal is modulated with a Code Division Multiple Access technique.

5. The method as recited in claim 4, wherein said delayed version of said first signal is delayed by an amount equal to at least a substantial fraction of one chip delay of said Code Division Multiple Access technique.

6. The method as recited in claim 2, wherein said communication system further includes a second radio frequency receiver, a third antenna, and a second transmission line connecting said second radio frequency receiver and said third antenna, further comprising:

directing, from said third antenna to a first end of said second transmission line, a third signal received by said third antenna;

receiving, at a second end of said second transmission line by said receiver, said third signal for uplink diversity in said communication system, and wherein said receiver is a RAKE receiver.

7. An apparatus for implementing downlink diversity in a communication system, comprising:

a transmitting source for transmitting a first signal at a transmit frequency from a first antenna;

a splitter for producing a replica of said first signal at said transmit frequency;

a receiver, at a first end of a first coaxial line, for receiving a second signal at a receive frequency, said second signal received by a second antenna; and means for directing said replica of said first signal at said transmit frequency to travel from a second end of said first coaxial line to said receiver such that said receiver reflects said replica of said first signal to produce a delayed replica of said first signal, said means for directing further directing said delayed replica of said first signal to said second antenna for transmission.

8. The apparatus as recited in claim 7, wherein said means for directing further comprises:

a filter having an input for receiving said replica of said first signal and an output for outputting the same, wherein said output of said filter reflects signals at said receive frequency; and a circulator having a first port connected to said output of said filter, a second port connected to the other end of said first coaxial line, and a third port connected to said second antenna.

9. A method of producing delay of a signal to implement uplink or downlink spatial diversity in a communication system, the method comprising the steps of:

producing a first and second signal via a signal source;

time delaying the first signal using a coaxial conductor of a pre-existing antenna structure to produce a time delayed version of the first signal, the pre-existing antenna structure comprising a pre-existing transmit antenna structure for uplink spatial diversity and a pre-existing receive antenna structure for downlink spatial diversity; and presenting the time delayed version of the first signal and the second signal to a receiver to implement uplink or downlink spatial diversity.

10. The method of claim 9, wherein the transmitter resides in a base-station of the communication system and the receiver resides in a mobile station when downlink spatial diversity is implemented.

11. The method of claim 9, wherein the transmitter resides in a mobile station and the receiver resides in a base-station of the communication system when uplink spatial diversity is implemented.

* * * * *